United States Patent
Mathew et al.

(10) Patent No.: US 12,187,907 B2
(45) Date of Patent: Jan. 7, 2025

(54) SELF-INITIATED ENERGY CURABLE INK COMPOSITIONS

(71) Applicant: SUN CHEMICAL CORPORATION, Parsippany, NJ (US)

(72) Inventors: Mathew C. Mathew, Carlstadt, NJ (US); David Biro, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 79 days.

(21) Appl. No.: 18/016,792

(22) PCT Filed: Jul. 28, 2021

(86) PCT No.: PCT/US2021/043382
§ 371 (c)(1),
(2) Date: Jan. 18, 2023

(87) PCT Pub. No.: WO2022/026502
PCT Pub. Date: Feb. 3, 2022

(65) Prior Publication Data
US 2023/0287230 A1    Sep. 14, 2023

Related U.S. Application Data

(60) Provisional application No. 63/059,240, filed on Jul. 31, 2020.

(51) Int. Cl.
| | | |
|---|---|---|
| *C09D 11/38* | (2014.01) | |
| *B41M 5/52* | (2006.01) | |
| *C08F 2/46* | (2006.01) | |
| *C08F 2/50* | (2006.01) | |
| *C08G 61/04* | (2006.01) | |
| *C09D 11/32* | (2014.01) | |

(52) U.S. Cl.
CPC ........... *C09D 11/38* (2013.01); *B41M 5/5209* (2013.01); *C09D 11/32* (2013.01)

(58) Field of Classification Search
CPC .............. B41M 5/5209; C08F 222/102; C08F 222/103; C08F 220/385; C09D 11/32; C09D 11/38; C09D 11/03; C09D 11/101; C09D 4/00
USPC ...... 347/100, 95, 84, 1; 522/6, 189, 184, 71, 522/1; 520/1
See application file for complete search history.

(56) References Cited

U.S. PATENT DOCUMENTS

| | | |
|---|---|---|
| 4,022,674 A | 5/1977 | Rosen |
| 9,884,936 B2 | 2/2018 | Gaudl et al. |
| 10,005,717 B2 | 6/2018 | Gevaert et al. |

| | | | |
|---|---|---|---|
| 2005/0261388 A1 | 11/2005 | Gould et al. | |
| 2005/0261391 A1* | 11/2005 | Narayan-Sarathy | C09D 175/16 522/173 |
| 2012/0015159 A1 | 1/2012 | Herlihy et al. | |

FOREIGN PATENT DOCUMENTS

| | | |
|---|---|---|
| EP | 0 759 461 A1 | 2/1997 |
| EP | 0759461 * | 2/1997 |
| WO | WO 2018/146495 | 8/2018 |
| WO | WO 2019/077364 | 4/2019 |
| WO | WO 2019/139948 | 7/2019 |
| WO | WO 2019/139948 A1 | 7/2019 |

OTHER PUBLICATIONS

International Search Report issued in International Application No. PCT/US21/43382 mailed Nov. 12, 2021.
Written Opinion of the International Searching Authority issued in International Application No. PCT/US21/43382 mailed Nov. 12, 2021.
International Preliminary Report on Patentability (Chapter 1 of the Patent Cooperation Treaty) issued in International Application No. PCT/US21/43382 , mailed May 26, 2022.
Integrating the photoinitiator-self-initiating resins produce UV coatings with few extractables. By Esselbrugge, Hilbert. From European Coatings Journal (2007), (6), 60-63).
Novel self-initiating UV-curable resins: generation three. By Gould, Michael L.; Narayan-Sarathy, Sridevi; Hammond, Terry E.; Fechter, Robert B. From RadTech Europe 05: UV/EB—Join the Winning Technology, [Conference Proceedings], Barcelona, Spain, Oct. 18-20, 2005 (2005), 1, 245-251.
Decker, Christian; Moussa, Khalil. *Makromolekulare Chemie* (1991), 192(3), 507-22.
Decker, C. " Photoinitiated curing of multifunctional monomers", *Acta Polymerica* (1994), 45(5), 333-47.
Decker, C.; Elzaouk, B., Photopolymerization of functional monomers. VII. Evaluation of the rate constants of propagation and termination: (European Polymer Journal (1995), 31(12), 1155-63).
Zhen, Wenyuan; Li, Yunqing; Zhou, Hongyong; Wang, Jiaxi, "Preparation and properties of functional UV curable monomers", *Tuliao Gongye* (2009), 39(8), 15-19, 23).

* cited by examiner

*Primary Examiner* — Jessica Whiteley
(74) *Attorney, Agent, or Firm* — Marian E. Fundytus; Ostrolenk Faber LLP.

(57) ABSTRACT

The present invention provides energy curable compositions comprising self-initiating oligomers, amine synergists and Group IV metal chelates. The compositions optionally comprise acrylate monomers having carbonate ester, carbamate, or oxazolidinone groups. The compositions of the present invention exhibit improved cure, and are suitable for packaging, such as food packaging.

22 Claims, 2 Drawing Sheets

SELF-INITIATED ENERGY CURABLE INK COMPOSITIONS

CROSS REFERENCE TO RELATED APPLICATIONS

The present application is a § 371 National Phase application based on PCT/US2021/43382 filed Jul. 28, 2021, which claims the benefit of U.S. Provisional Application No. 63/059,240, filed Jul. 31, 2020 the subject matter of each of which is incorporated by reference in their entirety.

FIELD OF THE INVENTION

The present invention is related to energy curable compositions that, when cured, exhibit low migration levels. The compositions of the invention comprise self-initiating oligomers. The compositions of the present invention are suitable for use in applications such as food, pharmaceutical, personal care, and cosmetic packaging.

BACKGROUND OF THE INVENTION

Actinically curable compositions, such as inks, primers, coatings, and adhesives are known in the art. These compositions cure using ultraviolet (UV), and/or electron beam (EB) radiation, with such radiation causing polymerization.

However, to achieve adequate UV cure it is generally necessary to include a photoinitiator in the composition. The use of common photoinitiators has the disadvantage that residues of the photoinitiators may migrate after curing. This is disadvantageous because these migrated residues can contaminate the environment, as well as materials contained with articles comprising the cured compositions, such as food packaging. Most photoinitiators, for example, are classified as toxic substances and compositions that include such photoinitiators may not be suitable for packaging for food, pharmaceutical, cosmetic, personal care items, and the like. In addition, incomplete curing may result in free monomers/oligomers that may result in environmentally toxic moieties.

U.S. Pat. No. 9,884,936 discloses photoactive resins that comprise an aromatic ketone monomer that includes a biphenyl moiety, and a chain ending group selected from hydrogen, a methylol group, and mixtures thereof. Also disclosed are radiation curable compositions containing the photoactive resin, mono- or multi-functional acrylates, an amine, and optionally photoinitiators, and optionally a colorant.

U.S. Pat. No. 10,005,717 discloses a photoreactive binder that is a compound that is obtained by the reaction of one or more amines with a benzophenone derivative. The compounds have a (meth)acrylate functional group. Use of these compounds in UV curable compositions enhances curing.

WO 2019/139948 discloses energy curable compositions comprising one or more polymerizable components, one or more photoinitiators, wherein at least one photoinitiator must be an acyl phosphineoxide photoinitiator, and a group IV metal chelating agent. The compositions optionally contain a self-initiating oligomer.

US 2012/0015159 describes cyclic carbamate compounds which are the reaction product of a cyclic carbamate having an acrylate functional group with an aliphatic amine compound. The cyclic carbamate compounds are useful as oxygen scavengers in energy-curable compositions.

WO 2018/146495 discloses an inkjet ink comprising: isobornyl acrylate; an N-vinyl amide monomer, an N-acryloyl amine monomer, and/or an N-vinyl carbamate monomer; a passive resin; a radical photoinitiator; optionally a difunctional (meth)acrylate monomer; and optionally a colorant.

WO 2019/077364 describes an inkjet ink comprising one or more (meth)acrylate monomers, an N-vinyl carbamate monomer, a dispersed pigment, and a radical photoinitiator.

U.S. Pat. No. 4,022,674 discloses compounds that are polyfunctional ethylenically unsaturated monomers and prepolymers containing a benzophenone or a substituted benzophenone moiety. The compounds are prepared by reacting a polyfunctional polyethylenically unsaturated monomer or the like with a suitable carboxy-substituted benzophenone.

US 2005/0261388 describes multifunctional acrylate oligomers formed by Michael addition reaction of acrylate monomers and oligomers with β-ketoesters, β-diketones, β-keto amides, and/or other β-dicarbonyl compounds, to obtain resins comprising photoactive ketone groups directly resulting from the Michael addition reaction. The Michael addition resins are modified to contain pendant Type I or Type II photoactive moieties. The resins may include an amine synergist.

Esselbrugge et al. disclose self-initiating resins prepared by Michael addition of acrylate monomers/oligomers with beta-ketoesters or beta-diketones (Integrating the photoinitiator-self-initiating resins produce UV coatings with few extractables. By Esselbrugge, Hilbert. From *European Coatings Journal* (2007), (6), 60-63). Gould et al. teach UV-curable resins that contain a stable photoactive chromophore that becomes part of the resin/oligomer structure through the Michael reaction between beta-diketones, beta-ketoesters, and/or beta-ketoamides with common acrylates (Novel self-initiating UV-curable resins: generation three. By Gould, Michael L.; Narayan-Sarathy, Sridevi; Hammond, Terry E.; Fechter, Robert B. From *RadTech Europe 05: UV/EB—Join the Winning Technology*, [Conference Proceedings], Barcelona, Spain, Oct. 18-20, 2005 (2005), 1, 245-251).

Several groups have prepared acrylate monomers that contain cyclic carbonate, carbamate, or oxazolidone functional groups (A new class of highly reactive acrylic monomers. 2. Light-induced copolymerization with difunctional oligomers. By Decker, Christian; Moussa, Khalil. From Makromolekulare Chemie (1991), 192(3), 507-22; Photoinitiated curing of multifunctional monomers. By Decker, C. From *Acta Polymerica* (1994), 45(5), 333-47; Photopolymerization of functional monomers. VII. Evaluation of the rate constants of propagation and termination: (*European Polymer Journal* (1995), 31(12), 1155-63). By Decker, C.; Elzaouk, B; Preparation and properties of functional UV curable monomers: By Zhen, Wenyuan; Li, Yunqing; Zhou, Hongyong; Wang, Jiaxi. From Tuliao Gongye (2009), 39(8), 15-19, 23). These monomers are highly reactive, and exhibit improved cure compared to conventional acrylate monomers.

However, there is still a need within the art of formulating actinically curable compositions comprising purposefully designed formulation components that are more suitable for food packaging.

BRIEF SUMMARY OF THE INVENTION

The present invention provides energy curable compositions that exhibit low migration levels of unreacted monomers, photodegradation products, etc. after curing on a substrate. The compositions of the invention are suitable for applications where it is necessary to minimize contaminants in the products or the environment, such as for food, pharmaceutical, and cosmetic packaging, personal care items, and the like.

In a particular aspect, the present invention provides an energy curable composition, comprising:
(a) 10 wt % to 60 wt % one or more self-initiating oligomers, based on the total weight of the composition;
(b) 2 wt % to 20 wt % one or more amine synergists, based on the total weight of the composition;
(c) 0.5 wt % to 10 wt % one or more group IV metal chelates, based on the total weight of the composition;
provided that the composition contains less than 0.5 wt % of any acyl phosphine oxide photoinitiators.

In certain embodiments, the energy curable compositions further comprise one or more acrylate functional monomers. In some embodiments, at least one acrylate functional monomer comprises carbonate ester, carbamate, or oxazolidinone groups.

In certain embodiments, the self-initiating oligomers are multifunctional molecules that include one or more photoactive moieties, such as ketone groups, aromatic ketone groups, or Type I or Type II photoinitiator derived moieties bound, for example as pendant groups, to a crosslinkable (meth)acrylate backbone. For example, the self-initiating oligomers may comprise multifunctional molecules which include multiple aromatic ketone groups, such as benzophenone or benzophenone derivative groups, bound to a crosslinkable (meth)acrylate resin backbone.

In another aspect, the energy curable composition is a technical varnish composition, an ink composition, or a coating composition. In certain embodiments, the compositions are suitable for flexographic printing. The compositions of the invention are, however, suitable for any type of printing or coating method.

In certain aspects, the present invention also provides methods of printing the compositions of the invention on a substrate, and substrates having printed thereon a composition of the invention. The present invention also provides articles, such as packaging materials, comprising the compositions of the invention, and/or the printed substrates of the invention.

These and other objects, advantages, and features of the invention will become apparent to those persons skilled in the art upon reading the details of the formulations and methods as more fully described below.

BRIEF DESCRIPTION OF THE DRAWINGS

FIG. 1 illustrates the double bond conversion of Example I-11 and Example C-11(I) on various polypropylene films.

FIG. 2 illustrates the reactivity of cyan inks using Photo DSC (photodifferential scanning calorimetry) to measure enthalpy.

DETAILED DESCRIPTION OF THE INVENTION

Figure 1:
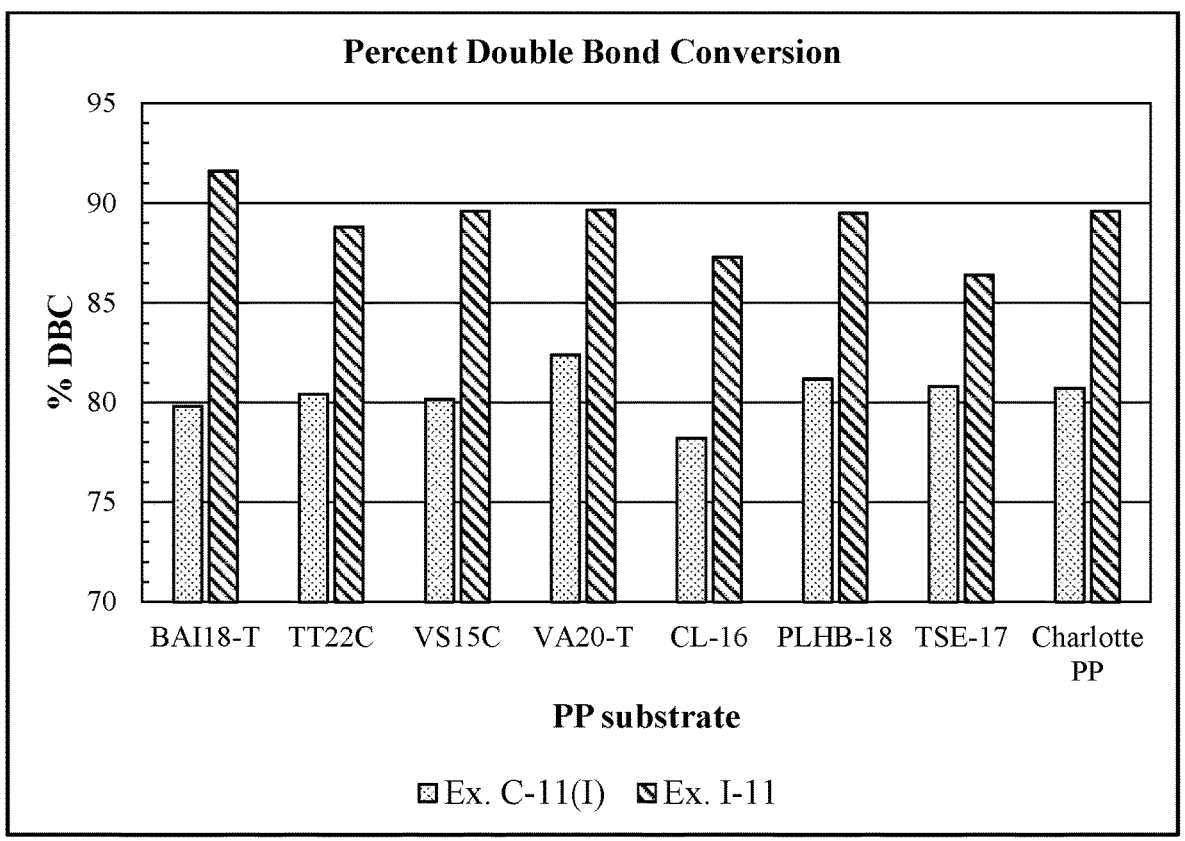
FIG. 1.

The energy curable compositions of the present invention are based on self-initiating oligomer-based actinically curable, such as UV, systems. Use of the self-initiating oligomers reduces the amount of traditional photoinitiators, which are recognized as often being relatively toxic, necessary to achieve adequate cure of the compositions. The cured compositions of the present invention exhibit reduced migration of partially reacted monomers/oligomers, as well as degradation products of traditional photoinitiators.

These novel energy curable compositions (e.g. inks) offer a new approach to photopolymerization chemistry that is free from current photoinitiator supply limitations and increasing regulatory restrictions. Laboratory evaluations and Kopack press trials have demonstrated that the self-initiating products are comparable to or better in performance than conventional UV flexographic ink systems, with additional advantages in terms of odor and migration, viscosity and flow, and lower energy required for cure to enable higher speed printing. Although flexographic printing is a preferred embodiment, the compositions of the present invention can be applied to a substrate by any known printing or coating method. Methods of printing and/or coating include, but are not limited to, flexographic, gravure, screen printing, digital printing, inkjet printing, letterpress, lithographic, bar coating, curtain coating, and the like.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are non-woven substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. flexible film, cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "inks and coatings," "inks," and "coatings" are used interchangeably, and refer to compositions of the invention, or, when specified, compositions found in the prior art (comparative). Inks and coatings typically contain resins, solvent, and, optionally, colorants. Coatings are often thought of as being colorless or clear, while inks typically include a colorant. A clear coating may be used as a technical varnish, i.e. used as a vehicle for an ink, and a colorant is mixed with the technical varnish to prepare a colored ink.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source may be used to cure compositions prepared according to the current invention.

As used herein, "energy-curable" refers to a composition that can be cured by exposure to one or more types of actinic radiation. Compositions of the current invention are especially suited for use in compositions curable under the action of UV light and/or electron-beam.

As used herein, "(meth)acrylate" and "(meth)acrylic acid" include both acrylate and methacrylate, and acrylic acid and methacrylic acid.

As used herein, the term "alkyl" refers to straight chain and branched chain saturated non-cyclic, or cyclic (cycloalkyl) hydrocarbons, having from 1 to 30 carbon atoms, preferably 1 to 10 carbon atoms. Representative straight chain alkyl groups include methyl, -ethyl, -n-propyl,-n-butyl, -n-pentyl, -n-hexyl, n-heptyl, n-octyl, n-nonyl, n-decyl, and n-amyl. Representative branched alkyl groups include isopropyl, sec-butyl, isobutyl, tert-butyl, isopentyl, neopentyl, 1-methylbutyl, 2-methylbutyl, 3-methylbutyl, 1, 1-dimethylpropyl, 1,2-dimethylpropyl, 1-methylpentyl, 2-methylpentyl, 3-methylpentyl, 4-methylpentyl, 1-ethylbutyl, 2-ethylbutyl, 3-ethylbutyl, 1, 1-dimethylbutyl, 1,2-dimethylbutyl, 1,3-dimethylbutyl, 2,2-dimethylbutyl, 2,3-dimethylbutyl, 3,3-dimethylbutyl, 5-methylhexyl, 6-methylheptyl, 2-ethylhexyl, and the like.

As used herein, the term "alkylene" means the divalent hydrocarbon radical corresponding to the above defined alkyl.

As used herein, the terms "alkoxy" or "alkyloxy" are intended to include those alkyl groups of the designated length in either a linear or branched or cyclic configuration linked through an ether oxygen having its free valence bond from the ether oxygen. Examples of linear alkoxy groups are methoxy, ethoxy, propoxy, butoxy, pentoxy and hexoxy. Examples of branched alkoxy are isopropoxy, sec-butoxy, tert-butoxy, isopentoxy and isohexoxy. Examples of cyclic alkoxy are cyclopropyloxy, cyclobutyloxy, cyclopentyloxy and cyclohexyloxy.

As used herein, the term "alkenyl" designates straight, branched or cyclic hydrocarbon monovalent radicals having one or more ethylenic unsaturations and having from 2 to n carbon atoms such as. For example, vinyl, 1-propenyl, 2-propenyl(allyl), 1-butenyl, 2-butenyl, 2-pentenyl, 3-pentenyl, 3-methyl-2-butenyl, 3-hexenyl, 2-hexenyl, 2-heptenyl, 1,3-butadienyl, pentadienyl, hexadienyl, heptadienyl, heptatrienyl and the like, including all possible isomers thereof.

As used herein, the term "amine" refers to an ammonia derivative wherein one, two or three hydrogen atoms have been replaced by an organic (carbon containing) substituent.

As used herein, the phrase "optionally substituted" refers to a group that is either unsubstituted or substituted.

As used herein, "monomer" refers to a small molecule having one or more functional groups. Monomers react with other monomers, either the same or different, to form monomer chains (oligomers and/or polymers). Each monomer in a chain is a monomer repeating unit. A monomer is the smallest unit that makes up an oligomer or a polymer. A monomer is a low molecular weight molecule, usually less than or equal to 100 Daltons weight average molecular weight (Mw).

As used herein, "oligomer" refers to a chain of a few monomer repeating units. Oligomers are a few to several monomer units long chains, and have a mid-range weight average molecular weight of about 100 Daltons to about 10,000 Daltons.

As used herein, "polymer" refers to a large molecule, containing multiple monomer and/or oligomer repeating units. Polymers are high molecular weight molecules, having a weight average molecular weight of greater than about 10,000 Daltons.

As used herein, "monofunctional" means having one functional group.

As used herein, "multifunctional" means having two or more functional groups. A multifunctional monomer, for example, can be di-functional, tri-functional, tetra-functional, or have a higher number of functional groups. The two or more functional groups can be the same or different.

As used herein, "double bond conversion," "DBC" and "% DBC" describe the percentage of carbon-carbon double bonds (—C=C—) that are converted to single bonds (—C—C—), or the extent to which all of the monomers and/or oligomers are converted to polymer, when the compositions of the invention are printed on a substrate and cured.

As used herein, "self-initiating monomer," "self-initiating oligomer" and "self-initiating resin" refer to an auto-polymerizable actinically curable compound, such as an acrylate oligomer, that comprises an ethylenically unsaturated monomer or oligomer having two or more functional groups, wherein at least one of the functional groups is a photo labile chromophore, and wherein the functional groups can react to polymerize the compound. Upon exposure to actinic radiation, the photo labile chromophore releases free radicals to initiate polymerization. Compositions comprising these self-initiating compounds can be cured with standard UV curing conditions, with a reduced amount of additional photoinitiators, preferably no added photoinitiators.

As used herein, the term "density" of an ink or coating refers to the perceived darkness of a substance, material, or image caused by the absorption or reflection of light impinging on the material. Differences in density as related to color are also known as gray levels. As the density of a material increases, the amount of light that is absorbed by the material increases, while the amount of light reflected from or transmitted by the material decreases. The absorption of light is inversely proportional to the transmission or reflectance of light.

Compositions and Methods of Use Thereof

UV curable inks that are used for food packaging applications must fulfill very low migration levels. One part of migration originates from the photoinitiator and from products of photo cleavage. There is thus a need to develop photo-reactive inks with no or low migration level, along with a high UV reactivity. This has been partially solved by using "polymeric photoinitiators" i.e. photoinitiators with higher molecular weight. However, most of the polymeric photoinitiators have solubility issues, poor reactivity and have a big impact on ink flow.

The energy curable compositions of the present invention address these problems. The energy curable compositions of the present invention comprise one or more self-initiating oligomers, one or more amine synergists, and one or more group IV metal chelates. The energy curable compositions of the present invention optionally comprise one or more acrylate functional monomers, preferably having carbonate ester, carbamate, or oxazolidinone groups. The compositions of the invention optionally comprise one or more polymeric thioxanthone photoinitiators.

The energy curable compositions of the invention have been developed based on the concept that UV oligomers or monomers that have built-in photo-labile chromophores are auto-polymerizable. This reduces the need for addition of photoinitiators.

Self-initiating UV flexographic inks have been developed based on the concept that UV oligomers or monomers that have built-in photo labile chromophores are auto-polymerizable. For example, self-initiating resins having a ketone photo labile group can be prepared by a Michael addition reaction of beta-carbonyl Michael donors with Michael acceptors such as acrylates. Michael donors include, but are not limited to, β-ketoesters, β-diketones, β-keto amides, and β-keto anilides. The Michael addition resins can be further modified to contain pendant Norrish Type I (e.g. substituted benzoins, benzyl ketals, acetophenones, or acyl phosphine oxides) or Type II (e.g. substituted benzophenones, thioxanthones, camphorquinones, or bisimidazoles) photoactive moieties (see US 2005/0261388). Preferably, the self-initiating oligomer does not Aromatic ketone resins, such as poly(phenylvinylketones), and condensation products of acetophenone and formaldehyde, show photoactivity. The photoactivity of ketone resins can be enhanced by a structural modification. It is postulated that the excited triplet state of the aromatic carbonyl compound in the ketone resin in combination with a hydrogen donor compound works as a bimolecular Norrish Type II photoinitiator system. By extending the π-system, the absorption maximum is shifted to longer wavelengths, and especially the molar extinction coefficient is largely increased. The photoactive resin shows improved cure properties and allows formulating of ultraviolet-curable printing inks. Such printing inks are especially suitable as low migration printing inks for indirect food contact, as they contain no splitting-type Norrish Type I photoinitiators such as alpha-aminoalkyl phenones, and acylphosphine oxides, and contain only oligomeric Type II photoinitiator systems (see U.S. Pat. No. 9,884,936). Although Norrish Type I photoinitiators are less preferred, they could be incorporated into the inks of the present invention, but preferably in small amounts.

Advancements in the polymeric photoinitiator technology have led to multifunctional oligomers/resins which include multiple benzophenone or benzophenone derivative groups bound to a crosslinkable (meth)acrylate resin backbone. A generalized structure is that of Formula (I):

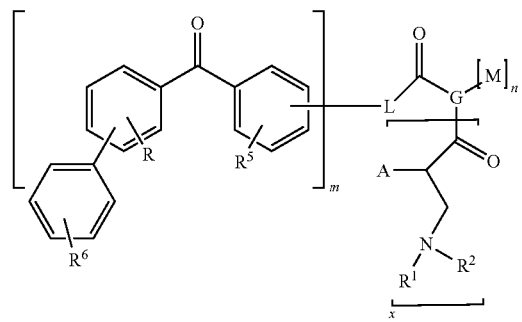

wherein

M is a group comprising 1 to 6 (meth)acrylate groups;

L is linker, selected from the group consisting of a single bond, a group of general formula —O—Y—, or a group of general formula -w-O(CO)-J-, wherein Y and J are selected from the group consisting of $C_1$-$C_3$ alkyl, $C_1$-$C_3$ alkylene, $C_1$-$C_3$ alkoxy, $C_1$-$C_3$ alkoxy-$C_1$-$C_3$ alkylene; and wherein w is selected from the group consisting of $C_1$-$C_3$ alkylene;

G is a linker comprising 0 to 100 hydroxyl groups;

$R^1$ and $R^2$ are each independently selected from the group consisting of H, $C_1$-$C_{30}$ alkyl, $C_2$-$C_{30}$ alkenyl, and a 5-6 membered saturated or aromatic ring containing one or more carbon atoms, up to three nitrogen atoms, and up to two oxygen atoms, said ring being optionally substituted by a $C_1$-$C_{30}$ alkyl, $C_1$-$C_{30}$ alkoxy, or by a $C_1$-$C_{30}$alkyloxy, or by a hydroxyl, or by a $C_1$-$C_6$ substituted acyloxy, or fused with a phenyl;

wherein each of said $C_1$-$C_{30}$ alkyl and $C_2$-$C_{30}$ alkenyl (as an $R_1$ or $R_2$ group, or as a substituent on an $R_1$ or $R_2$ group being a 5-6 membered saturated or aromatic ring) are each independently optionally substituted with one or more substituents independently selected from:

a 5-6 membered saturated or aromatic ring containing one or more carbon atoms, up to three nitrogen atoms, and up to two oxygen atoms;

a hydroxyl group;

a $C_1$-$C_{10}$ alkoxy group; and an amine of formula —$NR^3R^4$, wherein $R^3$ and $R^4$ are each independently selected from the group consisting of H and $C_1$-$C_8$ alkyl;

n is an integer from 1 to 100;

m is an integer from 1 to 100;

x is an integer from 0 to 100; and

R, $R^5$, and $R^6$ are each independently selected from the group consisting H, $C_1$-$C_8$ alkyl, $C_1$-$C_{10}$ alkoxy, and halogen;

with the proviso that if one of $R^1$ or $R^2$ is a hydrogen atom, then the carbon atom in the other of $R^1$ or $R^2$ is directly attached to the nitrogen (i.e. in alpha of the nitrogen) must be attached to at least two carbon atoms.

Commercial examples of self-initiating oligomers include, but are not limited to, Ebecryl LEO 101013 and Ebecryl LEO 10101 from Allnex; Miramer U 3678NT and Miramer U3684NT from Miwon.

The energy curable compositions of the present invention typically comprise about 10 wt % to about 60 wt % self-initiating oligomers, based on the total weight of the composition. For example, the energy curable compositions may comprise about 10 wt % to about 50 wt % self-initiating oligomers, based on the total weight of the composition; or about 10 wt % to about 40 wt %; or about 10 wt % to about 30 wt %; or about 10 wt % to about 20 wt %; or about 20 wt % to about 60 wt %; or about 20 wt % to about 50 wt %; or about 20 wt % to about 40 wt %; or about 20 wt % to about 30 wt %; or about 30 wt % to about 60 wt %; or about 30 wt % to about 50 wt %; or about 30 wt % to about 40 wt %; or about 40 wt % to about 60 wt %; or about 40 wt % to about 50 wt %; or about 50 wt % to about 60 wt %.

One or more amine synergists are typically included in the energy curable compositions of the invention. Amine synergists act synergistically with Type II photoactive moieties to enhance cure. Suitable examples include, but are not limited to: aromatic amines, such as 2-(dimethylamino) ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI.

The energy curable compositions of the present invention comprise one or more group IV metal chelates. Group IV metal chelates can react with hydroxyl and carboxyl functional monomers and oligomers to increase crosslink density. There are numerous kinds of chelating agents that may be used in the energy curable compositions of the present invention.

Titanium orthoesters are suitable metal chelating agents. The Ti(IV) chelate may be a titanium orthoester in which the titanium is chelated to one or more of a hydroxyl acid, phosphate, polyol, diketo, or amino alcohol compound. Titanium orthoesters include, but are not limited to, the compounds shown below.

A commercial example of a titanium orthoester is Tyzor® IAM (Dupont), a titanium-based phosphate complex having the structure:

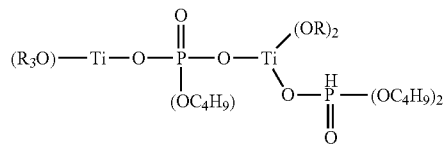

Titanium acetyl acetonate, shown below, is another suitable metal chelate.

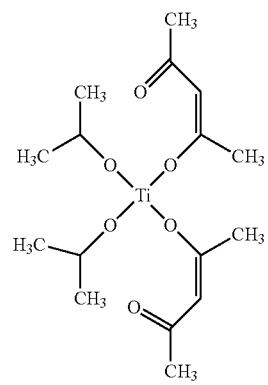

Tetraalkyl titanates are suitable metal chelates for use in the present invention. Tetraalkyl titanates are represented by the general structure Ti(OR)$_4$, where R is $C_3$ to $C_8$ alkyl. Examples include, but are not limited to: tetraisopropyl titanate having the formula Ti(OC$_3$H$_7$)$_4$, available as TYZOR® TPT (Dupont); tetra-n-butyl titanate having the formula Ti(OC$_4$H$_9$)$_4$, available as TYZOR® TnBT; and tetrakis(2-ethylhexyl)titanate having the formula Ti(OCH$_2$CHC$_4$H$_9$)C$_2$H$_5$, available as TYZOR® TOT.

Suitable titanate chelates are those represented by general Formula (II):

wherein X is a functional group containing oxygen or nitrogen; Y is a two- or three-carbon chain; and each R is independently $C_1$ to $C_8$ alkyl.

Formula (II) is a transition metal complex, with the ligand attached to the metal via a coordinate bond. In coordination chemistry, a ligand is an ion or molecule (functional group) that binds to a central metal atom to form a coordination complex. The bonding with the metal generally involves formal donation of one or more of the ligand's electron pairs.

Representative examples of organic titanates and zirconates are listed in Table A.

TABLE A

| Organic titanates and zirconates | |
|---|---|
| Chemical Name | CAS No. |
| Tetra n-Butyl Titanate | 5593-70-4 |
| Tetra Isopropyl Titanate | 546-68-9 |
| Tetra 2-Ethylhexyl Titanate | 1070-10-6 |
| Poly Butyl Titanate | 162303-51-7 |
| Isopropyl Butyl Titanate | 68955-22-6 |
| Tetra n-Propyl Titanate | 3087-37-4 |
| Tetra Ethyl Titanate | 3087-36-3 |
| Tetra t-Butyl Titanate | 3087-39-6 |
| Tetra n-Propyl Zirconate | 23519-77-9 |
| Tetra n-Butyl Zirconate | 1071-76-7 |

Representative examples of titanium and zirconium chelates are listed in Table B.

TABLE B

| Titanium and zirconium chelates | |
|---|---|
| Chemical Name | CAS No. |
| titanium diisopropoxide bis(acetylacetonate) | 17927-72-9 |
| butyl titanium phosphate | 109037-78-7 |
| triethanolamine titanate | 36673-16-2 |
| di-iso-propoxy titanium bis ethyl acetoacetate | 27858-32-8 |
| alkonolamine titanate complex (titanium, diethylene glycol ethylene glycol triisopropanolamine complex, per CAS description) | 68784-47-4 |
| alkonolamine titanate complex (titanium, diethylene glycol propylene glycol triethanolamine complex (per CAS description) | 68784-48-5 |
| alkonolamine titanate complex (titanium, (s) - lactate polyethylene glycol triisopropanolamine ammonium complex (per CAS description) | 1072830-14-8 |
| titanium ammonium lactate | 65104-06-5 |
| ammonium zirconium lactate acetate | 68909-34-2 |
| triethanolamine zirconate | 101033-44-7 |
| di-iso-butoxy titanium bis ethyl acetoacetate | 83877-91-2 |

The titanium or zirconium chelate materials may be an alkoxide of an unsaturated alcohol. Titanium diisopropozide bis(acetylacetonate), listed in Table A, is exemplary.

Commercially available Ti(IV) chelates include, but are not limited to, Vertec PI-2 and Vertec 1A-10 from Worlée; Tyzor® TE, Tyzor® IAM, Tyzor® LA, and Tyzor® CLA, from DuPont/Brentagg. Commercially available zirconium chelates include, but are not limited to, Tyzor® 212, Tyzor® 217, and Tyzor® NBZ, from Brentagg.

For example, suitable zirconium chelates are those based on propionates, having the general Formula (III):

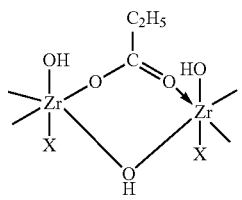

(III)

wherein each X is independently OH or $O2CC2H_5$.

Commercially available zirconium chelates include, but are not limited to, Tyzor® 212, Tyzor® 217, and Tyzor® NBZ.

The energy curable compositions of the present invention typically comprise group (IV) metal chelates in an amount of about 0.5 wt % to about 10 wt %, based on the total weight of the composition. For example, group (IV) metal chelates may be present in an amount of about 0.5 wt % to about 5 wt %; or about 0.5 wt % to about 1 wt %; or about 1 wt % to about 10 wt %; or about 1 wt % to about 5 wt %; or about 5 wt % to about 10 wt %.

In some embodiments, the energy curable compositions of the present invention may comprise one or more additional ethylenically unsaturated monomers.

Examples of suitable monofunctional ethylenically unsaturated monomers include, but are not limited, to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t.butyl cyclohexyl acrylate; 3,3,5-trimethyl-cyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl 1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts:

Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10 decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Other functional monomer classes capable of being used in part in these formulations include cyclic lactam such as N-vinyl caprolactam; N-vinyl oxazolidinone and N-vinyl pyrrolidone, and secondary or tertiary acrylamides such as N-acryloyl morpholine; diacetone acrylamide; N-methyl acrylamide; N-ethyl acrylamide; N-isopropyl acrylamide; N-t-butyl acrylamide; N-hexyl acrylamide; N-cyclohexyl acrylamide; N-octyl acrylamide; N-t-octyl acrylamide; N-dodecyl acrylamide; N-benzyl acrylamide; N-(hydroxymethyl)acrylamide; N-isobutoxymethyl acrylamide; N-butoxymethyl acrylamide; N,N-dimethyl acrylamide; N,N-diethyl acrylamide; N,N-propyl acrylamide; N,N-dibutyl acrylamide; N,N-dihexyl acrylamide; N,N-dimethylamino methyl acrylamide; N,N-dimethylamino ethyl acrylamide; N,N-dimethylamino propyl acrylamide; N,N-dimethylamino hexyl acrylamide; N,N-diethylamino methyl acrylamide; N,N-diethylamino ethyl acrylamide; N,N-diethylamino propyl acrylamide; N,N-dimethylamino hexyl acrylamide; and N,N'-methylenebisacrylamide.

When present, the energy curable compositions of the present invention typically comprise additional ethylenically unsaturated monomers in an amount of about 2 wt % to about 40 wt %, based on the total weight of the composition. For example, the compositions may comprise about 2 wt % to about 30 wt % additional ethylenically unsaturated monomers, based on the total weight of the composition; or about 2 wt % to about 20 wt %; or about 2 wt % to about 10 wt %; or about 2 wt % to about 5 wt %; or about 5 wt % to about 40 wt %; or about 5 wt % to about 30 wt %; or about 5 wt % to about 20 wt %; or about 5 wt % to about 10 wt %; or about 10 wt % to about 40 wt %; or about 10 wt % to about 30 wt %; or about 10 wt % to about 20 wt %; or about 20 wt % to about 40 wt %; or about 20 wt % to about 30 wt %; or about 30 wt % to about 40 wt %.

In some embodiments, the energy curable compositions of the present invention may comprise one or more acrylate functional monomers having carbonate ester, carbamate, or oxazolidinone groups, in addition to acrylate functionality. Inclusion of the monomers gives faster curing and more complete conversion in combination with the self-initiating oligomer. Examples include, but are not limited to:

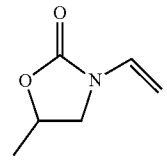

5-methyl-3-vinyloxazolidin-2-one available from BASF as vinyl methyl oxazolidinone (VMOX);

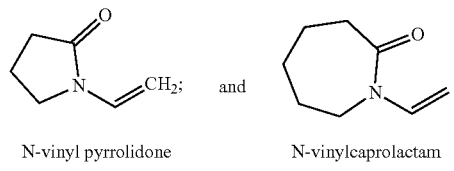

N-vinyl pyrrolidone      N-vinylcaprolactam e.g. Acticryl CL 1042 and Acticryl 1058 from Societe Nationale des Poudres et Explosifs (SNPE).

When present, the energy curable compositions typically comprise acrylate functional monomers having carbonate ester, carbamate, or oxazolidinone groups in an amount of about 2 wt % to 40 wt %, based on the total weight of the composition. For example, acrylate functional monomers having carbonate ester, carbamate, or oxazolidinone groups may be present in an amount of about 2 wt % to about 30 wt %; or about 2 wt % to about 20 wt %; or about 2 wt % to about 10 wt %; or about 2 wt % to about 5 wt %; or about 5 wt % to about 40 wt %; or about 5 wt % to about 30 wt %; or about 5 wt % to about 20 wt %; or about 5 wt % to about 10 wt %; or about 10 wt % to about 40 wt %; or about 10 wt % to about 30 wt %; or about 10 wt % to about 20 wt %; or about 20 wt % to about 40 wt %; or about 20 wt % to about 30 wt %; or about 30 wt % to about 40 wt %.

In some embodiments, the energy curable compositions may comprise one or more colorants. Suitable colorants include but are not limited to: organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

When present, the energy curable compositions of the present invention typically comprise colorants in an amount of about 1 wt % to about 50 wt %, based on the total weight of the composition. For example, the energy curable compositions may comprise about 1 wt % to about 40 wt % one or more colorants; or about 1 wt % to about 30 wt %; or about 1 wt % to about 20 wt %; or about 1 wt % to about 10 wt %; or about 10 wt % to about 50 wt %; or about 10 wt % to about 40 wt %; or about 10 wt % to about 30 wt %; or about 10 wt % to about 20 wt %; or about 20 wt % to about 50 wt %; or about 20 wt % to about 40 wt %; or about 20 wt % to about 30 wt %; or about 30 wt % to about 50 wt %; or about 30 wt % to about 40 wt %; or about 40 wt % to about 50 wt %.

In certain embodiments, the energy curable compositions of the present invention may comprise one or more waxes. Suitable waxes include, but are not limited to, amide wax, erucamide wax, polypropylene wax, paraffin wax, polyethylene wax, polytetrafluoroethylene wax, carnauba wax and the like. The wax may be a combination of said waxes. It is preferred that the wax be a blend of amide and erucamide waxes.

When present, the energy curable compositions of the present invention typically comprise waxes in an amount of about 0.1 wt % to about 5 wt %, based on the total weight of the composition. For example, the energy curable compositions may comprise about 0.1 wt % to about 1 wt % one or more waxes; or about 0.1 wt % to about 0.5 wt %; or about 0.5 wt % to about 5 wt %; or about 0.5 wt % to about 1 wt %; or about 1 wt % to about 5 wt %.

In some embodiments, the energy curable compositions and inks of the present invention may contain the usual additives to modify flow, surface tension, gloss and abrasion resistance of the cured coating or printed ink. These additives may function as leveling agents, in-can stabilizers, wetting agents, slip agents, flow agents, dispersants and de-aerators. Preferred additives include fluorocarbon surfactants, silicones and organic polymer surfactants and inorganic materials such as talc. As examples, the Tegorad product lines (Tegorad are trademarks and are commercially available products of Tego Chemie, Essen, Germany) and the Solsperse product lines (Solsperse are trademarks and are commercially available products of Lubrizol Company).

When present, each additive is independently present in the energy curable compositions of the present invention in an amount of about 0.1 wt % to about 5 wt %, based on the total weight of the composition. For example the additives may each independently be present in the energy curable compositions of the present invention in an amount of about 0.1 wt % to about 1 wt %; or about 0.1 wt % to about 0.5 wt %; or about 0.5 wt % to about 5 wt %; or about 0.5 wt % to about 1 wt %; or about 1 wt % to about 5 wt %.

In some embodiments, the energy curable compositions of the present invention may include one or more additional resins. Such resins include, but are not limited to, alkyds, phenolics, nitrocellulose, polyamides, vinyls, acrylics, rosin esters, hydrocarbons, polyurethane, epoxies, polyesters, styrenes, urea, melamine-formaldehydes, combinations thereof, and the like. In certain embodiments, the energy curable compositions of the invention contain additional resins having a weight average molecular weight of 1000-30,000 Daltons, preferred 1000-4000 Daltons, and include poly(acrylates), poly(ester), poly(urethanes), poly(amides) ketone resins, aldehyde resins, alkyd resins, phenol-formaldehyde resins, rosin resins, hydrocarbon resins, alkyd resins or mixtures of the aforementioned. In certain embodiments, one or more of the additional resins may be inert. Such resins improve pigment wetting, gloss, rheology and flexibility.

When present, the total amount of additional resins typically present in the energy curable compositions of the present invention are about 0.1 wt % to about 20 wt %, based on the total weight of the composition. For example, energy curable compositions of the present invention may comprise additional resins in an amount of about 0.1 wt % to about 10 wt %; or about 0.1 wt % to about 5 wt %; or about 0.1 wt % to about 1 wt %; or about 1 wt % to about 20 wt %; or about 1 wt % to about 10 wt %; or about 1 wt % to about 5 wt %; or about 5 wt % to about 20 wt %; or about 5 wt % to about 10 wt %; or about 10 wt % to about 20 wt %.

In certain embodiments, the energy curable compositions may contain, if cured by UV light, one or more photoinitiators. There is no restriction on the type, blend or concentration of photoinitiator used, and can include any suitable type of photoinitiators, such as, but not limited to: α-hydroxyketones, α-aminoketones, acyl phosphine oxides, thioxanthones, benzophenones, phenylglyoxylates, oxime esters, and combinations thereof. The compositions of the present invention contain less than 0.5 wt % of any acyl phosphine oxide photoinitiator. Preferably, the compositions do not contain any acyl phosphine oxide photoinitiators.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chlorothioxanthone, and 1-chloro-4-propoxythioxanthone; and combinations thereof.

Suitable benzophenones include, but are not limited to: benzophenone, 4-phenylbenzophenone, and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(η 5-2,4-cyclopentadien-1-yl)-bi s-[2,6-difluoro-3-(1H-pyrrol-1-yl) phenyl]; 9-fluorenone; camphorquinone; 2-ethyl anthraquinone; and the like.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

When present, the compositions of the invention typically comprise about 0.1 wt % to about 20 wt % photoinitiators, based on the total weight of the composition, provided that the composition contain less than 0.5 wt % acyl phosphineoxide photoinitiators, and most preferably no acyl phosphine oxide photoinitiators. For example, photoinitiators may be present in an amount of about 0.1 wt % to about 15 wt %; or about 0.1 wt % to about 20 wt %; or about 0.1 wt % to about 10 wt %; or about 0.1 wt % to about 5 wt %; or about 0.1 wt % to about 1 wt %; or about 1 wt % to about 20 wt %; or about 1 wt % to about 15 wt %; or about 1 wt % to about 10 wt %; or about 1 wt % to about 5 wt %; or about 5 wt % to about 20 wt %; or about 5 wt % to about 15 wt %; or about 5 wt % to about 10 wt %; or about 10 wt % to about 20 wt %; or about 10 wt % to about 15 wt %; or about 15 wt % to about 20 wt %.

In some embodiments, the energy curable compositions of the present invention may comprise one or more additional oligomers. Oligomers are substances that provide the vehicle for the energy curable compositions. Oligomers are similar to monomers, except that they have already been partially polymerized (i.e. a chain containing two or greater monomer repeating units), which makes them more viscous. During curing, the monomers react with the oligomers to create chains in three dimensions. In the printing industry, mainly resins/oligomers with acrylate functionality are used to provide the necessary reactivity to enable adequate cure for modern, high speed presses. The main classes of acrylated oligomers include epoxy acrylates, urethane acrylates, polyester acrylates, acrylic acrylates, hyperbranched polyester acrylates, waterborne UV polyurethane dispersions, and organic-inorganic hybrid materials. When present, the additional oligomers may be present in an amount of about in an amount of about 2 wt % to 40 wt %, based on the total weight of the composition. For example, additional oligomers may be present in an amount of about 2 wt % to about 30 wt %; or about 2 wt % to about 20 wt %; or about 2 wt % to about 10 wt %; or about 2 wt % to about 5 wt %; or about 5 wt % to about 40 wt %; or about 5 wt % to about 30 wt %; or about 5 wt % to about 20 wt %; or about 5 wt % to about 10 wt %; or about 10 wt % to about 40 wt %; or about 10 wt % to about 30 wt %; or about 10 wt % to about 20 wt %; or about 20 wt % to about 40 wt %; or about 20 wt % to about 30 wt %; or about 30 wt % to about 40 wt %.

In some embodiments, the energy curable compositions of the present invention may contain the usual extenders such as clay, talc, calcium carbonate, magnesium carbonate or silica to adjust water uptake, misting and color strength. When present, the energy curable compositions of the present invention typically comprise about 0.1 wt % to about 20 wt % one or more extenders, based on the total weight of the composition. For example, energy curable compositions of the present invention may comprise extenders in an amount of about 0.1 wt % to about 10 wt %; or about 0.1 wt % to about 5 wt %; or about 0.1 wt % to about 1 wt %; or about 1 wt % to about 20 wt %; or about 1 wt % to about 10 wt %; or about 1 wt % to about 5 wt %; or about 5 wt % to about 20 wt %; or about 5 wt % to about 10 wt %; or about 10 wt % to about 20 wt %.

The energy compositions of the present invention can be UV-cured by an actinic light source, such as for example UV-light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3000 mJ/cm$^2$, and more preferably within a range of about 50 to 500 mJ/cm$^2$. In addition, the bulb can be appropriately selected according to the absorption spectrum of the radiation curable composition. Moreover, the inks of this invention can be cured under inert conditions.

Alternatively, the energy curable compositions and inks of this invention can be cured by electron beam (EB). Commercially EB-dryers are available for example from Energy Science, Inc. of Wilmington, Mass, or from Advanced Electron Beams Inc. (AEB) of Wilmington, Mass. The energy absorbed, also known as the dose, is measured in units of kiloGrays (kGy), one kGy being equal to 1,000 Joules per kilogram. Usually, the electron beam dose should be within the range of 10 kGy to about 40 kGy for complete curing. With the radiation curable composition of this invention a radiation dose of 20-30 kGy at an oxygen level of <200 ppm is usually sufficient to get a dry, solvent resistant coating or ink.

Double bond conversion (DBC) is considered an important property that may influence the physical and mechanical properties of the final cured ink film. Ethylenically unsaturated monomers and oligomers contain carbon-carbon double bonds (—C═C—). DBC describes the percentage of carbon-carbon double bonds (—C═C—) that are converted to single bonds (—C—C—), or the extent to which all of the monomers and/or oligomers are converted to polymer, when cured. In essence, a higher conversion of double bonds may produce superior mechanical strength. The unreacted double bonds (monomer), on the other hand, may be present either as free monomer, or as pendant groups on the polymer network, which may adversely affect ink properties (e.g. migration of unreacted monomers).

EXAMPLES

The invention is further described by the following non-limiting examples which further illustrate the invention, and are not intended, nor should they be interpreted to, limit the scope of the invention.

Technology varnishes (TVs) were developed using Allnex Ebecryl LEO 10103 self-initiated oligomer and amine modified acrylate (aminated acrylic) for use with Solarverse pigment concentrates. The TVs were blended with Solarverse pigment concentrates to prepare finished inks.

Examples 1. Technology Varnishes

Inventive technology varnishes TV-1 and TV-2 were prepared according to the formulations in Tables 1 and 2.

TABLE 1

TV-1 - inventive technology varnish with zirconium propionate chelate

| Material | Description | Wt. % |
|---|---|---|
| Genorad 26 | Inhibitor | 0.50 |
| SR341 3-methyl-1,5-pentanediyl diacrylate | Monomer | 16.5 |
| SR399 DiPETA | Monomer | 11.0 |
| Ebecryl LEO 10103 (Allnex) | Self-initiating oligomer | 44.0 |
| Omnipol ASA (IGM) Amine synergist | Synergist | 12.0 |
| Ebecryl LEO 10552 | Aminated Acrylic | 11.0 |
| Zirconium Propionate | Adhesion promoter/cross linking agent | 4.00 |
| Byk 361 | Levelling Agent | 1.0 |
| Total | | 100 |

TABLE 2

TV-2 - inventive technology varnish with organic titanate (Tyzor IAM) chelate

| Material | Description | Wt. % |
|---|---|---|
| Genorad 26 | Inhibitor | 0.50 |
| SR341 3-methyl-1,5-pentanediyl diacrylate | Monomer | 16.5 |
| SR399 DiPETA | Monomer | 11.0 |
| Ebecryl LEO 10103 (Allnex) | Self-initiating oligomer | 44.0 |
| Omnipol ASA (IGM) Amine synergist | Synergist | 12.0 |
| Ebecryl LEO 10552 | Aminated Acrylic | 11.0 |
| Organic Titanate (Tyzor IAM) | Adhesion promoter/cross linking agent | 4.00 |
| Byk 361 | Levelling Agent | 1.0 |
| Total | | 100 |

Technology varnish TV-4 was prepared similarly to TV-1 and TV-2, except that more than 10% of the 3-methyl pentane diol acrylate (SR341) was replaced with vinyl methyl oxazolidinone (VMOX). Technology varnish TV-3 was prepared similarly to TV-4, except that it does not contain VMOX. The formulations are shown in Table 3.

TABLE 3

Technology varnishes TV-4 and TV-3

| | TV-3 | TV-4 |
|---|---|---|
| Inhibitor | 0.5 | 0.5 |
| 3-methyl-1,5-pentanediyl diacrylate | 15.2 | 4 |
| DiPETA | 10.2 | 10.2 |
| EB. LEO 10103 from Allnex | 40 | 40 |
| Polymeric Thioxanthone | 4 | 4 |
| High amine value acrylic | 11 | 11 |
| Vinyl methyl oxazolidinone - VMOX | 0 | 14 |
| Amine modified acrylic - LEO 10552 from Allnex | 14.6 | 11.8 |
| Zirconium Propionate | 3.5 | 3.5 |
| Levelling Agent - Byk 361 | 1 | 1 |
| Total | 100 | 100 |

Example 2. Inventive and Comparative Finished Inks

Inventive Examples I-1 to I-10 were prepared by mixing Solarverse UV flexographic pigment dispersions with TV-1 technology varnish, in a ratio of 40% pigment dispersion to 60% varnish. Comparative Examples C-1 to C-10 were prepared by mixing Solarverse UV flexographic pigment dispersion with LM 5003 varnish (Sun Chemical), in a ratio of 40% pigment dispersion to 60% varnish. LM 5003 are commercial low migration inks containing approximately 10-15% photoinitiator. UV cure was evaluated at comparable print density (±10%).

Pigment bases were as follows:
Process yellow=SVRS15
Process magenta=UVFQ27
Process cyan=UVFQ25
Process black=UVFQ46
Green=SVRS71
Orange=SVRS021
Red shade yellow=SVRS83
Reflex blue=SVRS61
Warm red=SVRS40
Resistant magenta=SVRS44

The printed inks were evaluated for cure (IPA double rubs) and tape adhesion as described below.

Printing

Prints on either PET-G or tube stock substrate were made using a 3 bcm anilox roller, and cured using a medium pressure mercury vapor lamp at 70 mJ/cm$^2$ light intensity.

Viscosity

Viscosity was measured using a cone and plate viscometer (AR1500 from TA Instruments) at 25° C., using a 2 inch cone at a shear rate of 100 s$^{-1}$.

Density

Density was measured using a SpectroEye spectrophotometer (from X-Rite), using the ISO T density standard settings.

Cure—Solvent Rub Resistance

Cure was assessed by measuring the alcohol rub resistance of cured prints. A cotton ball was soaked in isopropyl alcohol (IPA). The cotton ball was rubbed back and forth on the surface of the printed inks. The number of double rubs (i.e. back and forth) to removal of the ink from the substrate was counted. A higher number of double rubs indicates better cure.

Tape Adhesion

Adhesion of the inks was tested using a 4-inch strip of Scotch 610 tape. The printed substrate was laid on a flat, hard surface. The tacky side of the tape was placed flat on the surface of the printed substrate. The tape was then ripped from the print and examined for ink transfer from the surface of the printed substrate. Ink removal was assessed as a percentage of ink remaining on the printed substrate (i.e. 100% means no ink removal, and 0% means complete ink removal).

The testing results are shown in Table 4.

TABLE 4

Properties of finished inks

| Ex. | Pigment | Density | IPA Rubs PET-G | IPA Rubs Tube Stock | Tape Adhesion Tube Stock |
|---|---|---|---|---|---|
| C-1 | Process yellow | 1.41 | 55 | 40 | 25% |
| I-1 | Process yellow | 1.40 | 55 | 60 | 100% |
| C-2 | Process magenta | 2.12 | 60 | 28 | 100% |
| I-2 | Process magenta | 2.03 | 60 | 60+ | 100% |
| C-2 | Process cyan | 2.45 | 15 | 11 | 100% |
| I-2 | Process cyan | 2.31 | 17 | 16 | 100% |
| C-3 | Process black | 1.81 | 18 | 9 | 0% |
| I-3 | Process black | 1.96 | 20 | 8 | 100% |
| C-3 | Green | 1.70 | 17 | 10 | 100% |
| I-3 | Green | 1.81 | 17 | 14 | 100% |
| C-6 | Orange | 1.79 | 36 | 4 | 20% |
| I-6 | Orange | 1.89 | 42 | 19 | 100% |
| C-7 | RS yellow | 1.26 | 40 | 14 | 100% |
| I-7 | RS yellow | 1.25 | 60 | 32 | 100% |
| C-8 | Reflex blue | 2.30 | 60+ | 11 | 20% |
| I-8 | Reflex blue | 2.33 | 60+ | 30 | 100% |
| C-9 | Warm red | 1.23 | 18 | 4 | 20% |
| I-9 | Warm red | 1.27 | 60 | 16 | 100% |
| C-10 | Resistant magenta | 1.70 | | 7 | 20% |
| I-10 | Resistant magenta | 1.69 | | 20 | 100% |

The results in Table 4 show that, at comparable density, the inventive inks I-1 to I-10, without photoinitiator, exhibit comparable or improved UV cure compared to comparative inks C-1 to C-10, as assessed by rub resistance. Tape adhesion of the inventive inks on tube stock was shown to be equal to or improved versus that of the comparative inks. Viscosity for each set of colored inks was comparable (500 to 1000 cps).

Example 3. Assessment of Migration

Example 1-2 ink was printed on polyethylene coated board substrate using a Harper Flexo proofer with a 550 line/3.0 bcm anilox roller. The printed ink was cured using a medium pressure mercury vapor lamp at 70 mJ/cm$^2$ light intensity.

Migration Testing

Migration testing measures how much of one or more contaminants leach out of the printed and cured ink, and penetrate the substrate, migrating to the non-printed side. Sections of print sample were cut and placed into custom stainless steel (SS) extraction cells designed according to FDA specifications for food contact packaging migration testing. The cell was composed of two SS plates which sandwich a Teflon gasket assembly. The gasket isolates only one surface of the print sample for extraction, and contains a cavity to hold the extracting solvent. The print samples were oriented in the cells so that the non-printed side was exposed to the extracting solvent. The non-printed side would be the food, or other product, contact side in packaging.

The surface area exposed within the cavity was 51 cm$^2$ (7.9 inch$^2$), and the extraction solvent was 80 ml of 95% ethanol (ETOH). Therefore, the solvent volume surface area ratio was 1.57 ml/cm$^2$ (10 ml/inch), which is in compliance with FDA default guidance. The samples were extracted for 24 hours at 40° C., and the solution was analyzed for components migrating out the ink by GC-MS (Varian 3400), interfaced to a Finnigan TSQ-7000 triple stage quadrupole tandem mass spectrometer equipped with an Xcaliber data system. The GC was equipped with a 30 meter×0.32 mm i.d. Guardian-ZB-5MS capillary column with a 0.25 μm film thickness (Phenomenex). The mass spectrometer was operated in electron ionization mode (70 eV), scanning for masses of 35-750 Da once each second. As a control, unprinted irradiated (i.e. medium pressure mercury vapor lamp at 70 mJ/cm$^2$ light intensity) board was also subjected to migration testing. Compounds extracted from the control irradiated board are impurities in the substrate itself. The migration testing results are reported as parts per billion (ppb), and shown in Table 5. The specific migration limit (SML) pursuant to Swiss ordinance for certain compounds is also shown in Table 5.

TABLE 5

Migration results

| Results of the analysis given as ppb | Irradiated Board* | Ex. I-2 | SML/Swiss ordinance PPB |
|---|---|---|---|
| Butylated hydroxytoluene (BHT antioxidant) | | 1.09 | 3000 |
| Kodaflex TXIB (2,2,4-Trimethyl-1,3-pentanediol diisobutyrate) | | 1.61 | 5000 |
| 3,5-di-t-butyl-4-hydroxybenzenepropionic acid, ethyl ester | 12.17 | 14.21 | |
| 4,8,12,16-tetramethylheptadecane-4-olide | 1.47 | 1.00 | |
| Methoxychlor olefin | 3.21 | 2.32 | |
| Irgafos 168 antioxidant | 33.29 | 35.52 | |
| Irgafos 168 antioxidant (oxidized form) | 20.00 | 9.64 | |
| Irganox 1076 antioxidant | 9.86 | 1.86 | |
| Total 95% ETOH Unprinted-Side Extractables | 80.01 | 67.28 | |

*unprinted substrate

The results in Table 5 show that the amounts of migratable components are well below the SML set by the Swiss Ordinance. And, surprisingly, it appears that Example 1-2 ink blocks leaching of impurities from the substrate itself. The results in Table 5 demonstrate that the Inventive Example 1-2 cyan ink containing self-initiating oligomer would be acceptable for use as low migration UV ink for food packaging.

The remaining inventive inks were tested in a similar manner, and migration testing showed little or no migration for substrates printed with the inventive inks.

Example 4. Odor Test

Prints of inventive Example 1-2 UV Flexo Cyan on PET-G film were compared against Solarflex FSP Cyan, comparative Example C-2, for odor. Inventive Example I-2A was made the same way as 1-2, except that TV-2 technical varnish was used, which contains organic titanate (Tyzor IAM) instead of TV-1, which contains zirconium propionate. Prints were kept in a wide mouth 16 oz glass jar at 75° C. for 1 hour before testing for odor. Odor was assessed by a panel of 5 people. Odor was rated on a scale of 1 to 5, where 1=least odor, and 5=most odor. The results are shown in Table 6.

TABLE 6

Odor results

| Test Material | Odor Rating |
|---|---|
| Unprinted PET-G | 1 |
| Ex. I-2A | 2 |
| Ex. I-2 | 1.7 |
| Solarflex FSP Cyan- FPP-38 (Ex. C2) | 4.25 |

As can be seen in Table 6, inks formulated with photoinitiator free technology varnish containing zirconium propionate and Tyzor IAM both yielded odor lower than Solarflex FSP cyan containing photoinitiator, which gave a very distinct odor. This is important because (a) odor is indicative of migrating materials; and (b) odor is an undesirable characteristic in printed materials, especially packaging materials.

Example 5. Double Bond Conversion

To further improve double bond conversion, more than 10% of the 3-methyl pentane diol acrylate (SR341) was replaced with vinyl methyl oxazolidinone (VMOX) in this set of examples. As shown above, TV-3 does not contain VMOX, while TV-4 contains VMOX. Finished ink Example C-11(I)— note that ink Example C-11(I) is comparative for the purposes of the present example (Example 5) as a comparison for the effect of VMOX, but would be covered by the present invention. Finished ink Example C-11(I) was prepared by blending TV-3 with UVFQ 25 (Solarverse process cyan base) in a 60:40 ratio. Finished ink Example I-11 was prepared by blending TV-4 with UVFQ 25 in a 60:40 ratio.

The inks were printed on various polypropylene films (see Table 7) using a 3.0 bcm anilox roller, and UV cured at light intensity of 50 mJ/cm². Prints were analyzed for double bond conversion (DBC) as described below.

Double Bond Conversion Test

DBC was analyzed using FTIR. A Thermo Scientific FTIR spectrometer with a diamond ATR accessory was used for collecting spectra for each ink. The ATR technique measures IR reflectance from the surface of the ink, and minimizes the contribution of the base film to the IR spectrum. The spectrum was taken by pressing the printed side of the film on the diamond crystal. For each experiment, 64 scans were taken.

For evaluating cure of the ink, the peak at 810 cm$^{-1}$ related to the acrylic moiety was used. As the ink cures, the amount of acrylate decreases and so the intensity of the 810 cm$^{-1}$ peak decreases. By referencing another peak that does not change during curing, 1720 cm$^{-1}$, a method was developed to correlate the intensity of the 810 cm$^{-1}$ to the degree of cure. The areas under the peak at 810 cm$^{-1}$ and 1720 cm$^{-1}$ were measured before curing of the ink, and after curing the ink. The ratio of the area under the peak at 810 cm$^{-1}$ to the area under the peak at 1720 cm$^{-1}$ (peak area at 810 cm$^{-1}$/peak area at 1720 cm$^{-1}$) was calculated before curing (Resin Ratio), and after curing (Cure Ratio). The DBC is calculated as [(Resin Ratio)–(Cure Ratio)/(Resin Ratio)]*100=% conversion. Results are reported as % conversion in Table 7, and illustrated in FIG. 1.

TABLE 7

Percent double bond conversion

| PP Substrate | Ex. C-11(I) % conversion | Ex. I-11 % conversion |
|---|---|---|
| BA18-T | 79.8 | 91.6 |
| TT22C | 80.4 | 88.8 |
| VS15C | 80.15 | 89.6 |
| VA20-T | 82.4 | 89.67 |
| CL-16 | 78.2 | 87.3 |
| PLHB-18 | 81.2 | 89.5 |
| TSE-17 | 80.8 | 86.4 |
| Charlotte PP | 80.7 | 89.6 |

As can be seen in Table 7 and FIG. 1, inventive Example I-11, containing VMOX, exhibited superior double bond conversion (i.e. higher degree of cure) versus Example C-11(I), without VMOX. Inventive Example I-11 cyan ink containing VMOX showed improved double bond conversion, up to greater than 91% on all substrates tested. When compared to Example C-11(I), Example I-11 showed about 10% to 12% improvement in cure. A major advantage of VMOX is that it copolymerizes with acrylates, and remains as part of the cured formulation. Without wishing to be bound by theory, the inventors hypothesize that a mechanism of action may theoretically include:

VMOX acts as an oxygen scavenger like amines.
VMOX forms an exciplex with oxygen to produce reactive radicals.
VMOX forms a donor-acceptor complex with acrylate.

This shows that VMOX along with other acrylate functional monomers with carbonate ester, carbamate, or oxazolidinone groups improves cure, and are thus preferred for inclusion in the energy curable compositions of the invention.

Figure 2:
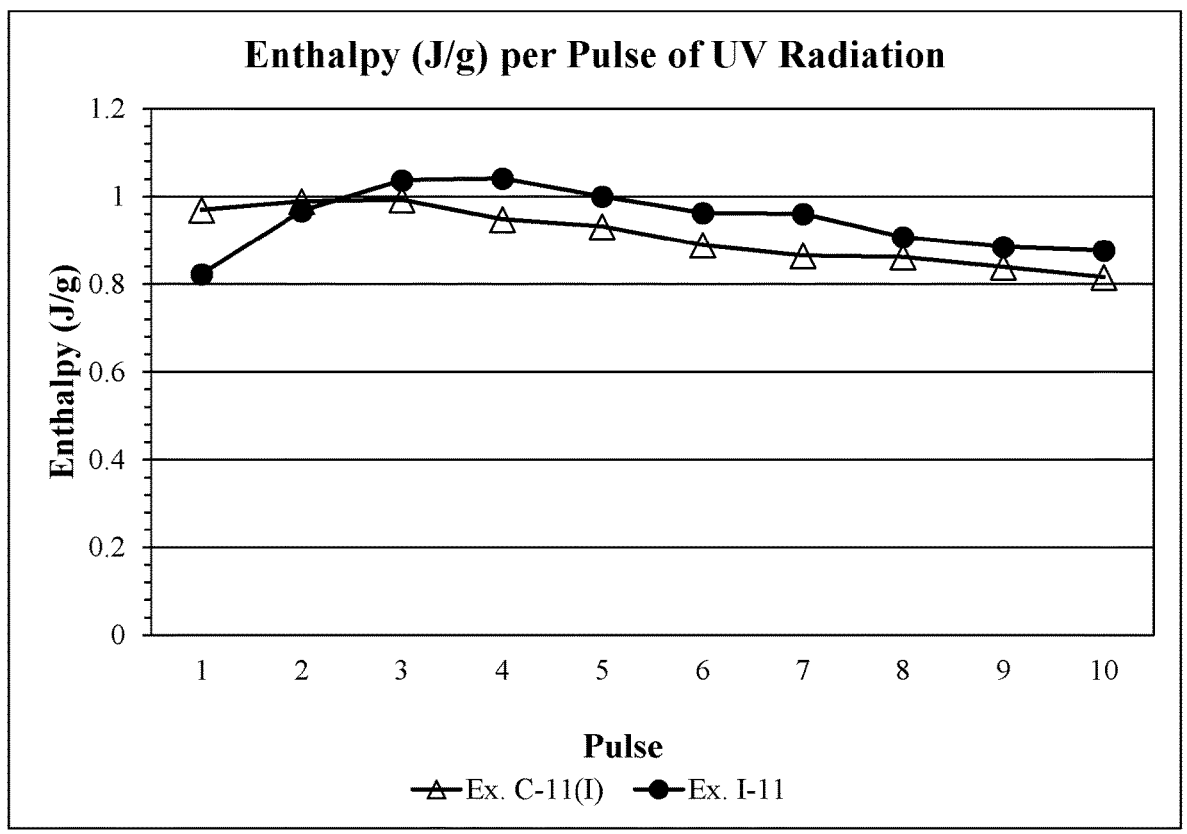
FIG. 2.

Another indicator of improved double bond conversion is reactivity of the cyan inks. A greater increase in enthalpy would be considered more reactive. The double bond conversion of inks I-11 and C-11(I) was assessed by measuring enthalpy (heat of reaction) using Photodifferential scanning calorimetry (Photo DSC) (Photo-DSC 204 F1 Phoenix from Netzsch). Samples were prepared in an open crucible that was irradiated by UV light. The mass of the C-11(I) sample was 4.553 mg, and the mass of the I-11 sample was 4.507 mg. The analysis of the samples was done under a nitrogen atmosphere at a constant temperature of 35° C. Irradiation occurred in a pulsed fashion with UV pulses, with a pulse time of 1 sec and an intensity of 1 W/cm². The enthalpy (J/g) per pulse of radiation is depicted in FIG. 2. As shown in FIG. 2, The enthalpy per pulse of UV radiation was generally higher for Example I-11 than Example C-11(I). The total heat of reaction of Example I-11 ink was 9.46 J/g, and the total heat of reaction of Example C-11(I) was 9.10 J/g. Example I-11 ink exhibited a greater increase in enthalpy compared to Example C-11(I) ink. This is consistent with the FTIR data showing % DBC.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. An energy curable composition, comprising:
   (a) 10 wt % to 60 wt % one or more self-initiating oligomers, based on the total weight of the composition, wherein the self-initiating oligomers comprise an ethylenically unsaturated monomer or oligomer having two or more functional groups, wherein at least one of the functional groups is a photo labile chromophore, and wherein the functional groups can react to polymerize the compound;
   (b) 2 wt % to 20 wt % one or more amine synergists, based on the total weight of the composition;
   (c) 0.5 wt % to 10 wt % one or more group IV metal chelates, based on the total weight of the composition;
   provided that the composition contains less than 0.5 wt % of any acyl phosphine oxide photoinitiators.

2. The composition of claim 1, wherein the composition does not contain any acyl phosphineoxide photoinitiators.

3. The composition of claim 1, wherein the metal chelate comprises titanium, zirconium, or combinations thereof.

4. The composition of claim 1, wherein the self-initiating oligomers are derived from the Michael addition reaction of Michael donors and Michael acceptors.

5. The composition of claim 4, wherein the Michael donors are β-dicarbonyl compounds; and/or wherein the Michael acceptors are (meth)acrylates.

6. The composition of claim 4, wherein the Michael donors are selected from the group consisting of β-ketoesters, β-diketones, β-keto amides, and β-keto anilides.

7. The composition of claim 1, wherein the self-initiating oligomers comprise multifunctional molecules which include one or more Norrish Type I or Type II photoactive moieties bound to a crosslinkable (meth)acrylate resin backbone.

8. The composition of claim 1, wherein the self-initiating oligomers comprise multifunctional molecules which include one or more aromatic ketone photoactive moieties bound to a crosslinkable (meth)acrylate resin backbone; and/or wherein the self-initiating oligomers comprise multifunctional molecules which include one or more multiple benzophenone or benzophenone derivative groups bound to a crosslinkable (meth)acrylate resin backbone.

9. The composition of claim 1, further comprising 2 wt % to 40 wt % one or more acrylate functional monomers, based on the total weight of the composition.

10. The composition of claim 9, comprising at least one acrylate functional monomer having carbonate ester, carbamate, or oxazolidinone groups.

11. The composition of claim 10, wherein the acrylate functional monomer is selected from the group consisting of vinyl methyl oxazolidinone, N-vinyl pyrrolidone, N-vinylcaprolactam, and combinations thereof.

12. The composition of claim 1, further comprising 0.1 wt % to 20 wt % one or more photoinitiators, based on the total weight of the composition; provided that the composition contains less than 0.5 wt % of any acyl phosphine oxide photoinitiators.

13. The composition of claim 12, wherein at least one photoinitiator is a polymeric thioxanthone photoinitiator.

14. The composition of claim 1, further comprising 1 wt % to 50 wt % colorant, based on the total weight of the composition; and/or further comprising 0.1 wt % to 5 wt % one or more waxes, based on the total weight of the composition; and/or further comprising 0.1 wt % to 20 wt % one or more extenders, based on the total weight of the composition; and/or further comprising 0.1 wt % to 20 wt % one or more additional resins, based on the total weight of the composition.

15. The composition of claim 1, further comprising one or more additives selected from the group consisting of inhibitors, leveling agents, in-can stabilizers, wetting agents, slip agents, flow agents, dispersants, de-aerators, surface active agents, and surfactants; wherein each additive is independently present in an amount of 0.1 wt % to 5 wt %, based on the total weight of the composition.

16. The composition of claim 1, wherein the composition is a technical varnish composition, an ink composition, or a coating composition; and/or wherein the composition is suitable for use in flexographic printing.

17. A method of printing a substrate, comprising:
   (a) providing a substrate;
   (b) applying the composition of claim 1 on the substrate; and
   (c) curing the composition on the substrate.

18. A substrate prepared by the method of claim 17.

19. The substrate of claim 18, wherein the cured composition exhibits less than 100 parts per billion of total migratable components.

20. An article comprising the substrate of claim 18.

21. The composition of claim 1, comprising 10 wt % to 55 wt % one or more self-initiating oligomers, based on the total weight of the composition.

22. The composition of claim 1, comprising 10 wt % to 50 wt % one or more self-initiating oligomers, based on the total weight of the composition.

* * * * *